United States Patent [19]
Greenberg et al.

[11] Patent Number: 5,277,919
[45] Date of Patent: Jan. 11, 1994

[54] METHOD OF STABILIZING PEPTIDE SWEETENERS IN CHEWING GUMS AND CONFECTIONS WITH BENZALDEHYDE ACETALS

[75] Inventors: Michael J. Greenberg, Northbrook; Sonya D. Johnson, Brookfield; Gordon N. McGrew, Evanston, all of Ill.

[73] Assignee: Wm. Wrigley Jr. Company, Chicago, Ill.

[21] Appl. No.: 832,808

[22] Filed: Feb. 7, 1992

Related U.S. Application Data

[63] Continuation-in-part of Ser. No. 595,093, Oct. 10, 1990, abandoned, and Ser. No. 577,770, Sep. 4, 1990, Pat. No. 5,167,972.

[51] Int. Cl.[5] ............................ A23L 2/26; A23G 3/30
[52] U.S. Cl. ............................................ 426/3; 426/5; 426/534; 426/536
[58] Field of Search ...................... 426/3, 5, 534, 536; 424/195.1

[56] References Cited

U.S. PATENT DOCUMENTS

| | | | |
|---|---|---|---|
| 3,818,107 | 6/1974 | Yolles | 426/3 |
| 3,857,964 | 12/1974 | Yolles | 426/3 |
| 3,862,340 | 1/1975 | Schreiber et al. | 426/65 |
| 3,879,425 | 4/1975 | Hall et al. | 260/340.9 |
| 3,898,283 | 8/1975 | Schreiber et al. | 260/565 R |
| 3,908,023 | 9/1975 | Schreiber et al. | 420/536 |
| 3,922,237 | 11/1975 | Schreiber et al. | 252/522 |
| 3,928,644 | 12/1975 | Schreiber et al. | 426/535 |
| 3,963,618 | 6/1976 | Muir | 210/500 M |
| 3,966,768 | 6/1976 | Pawloski | 260/338 |
| 4,031,140 | 6/1977 | Schreiber et al. | 260/611 A |
| 4,036,886 | 7/1977 | Schreiber | 260/599 |
| 4,101,720 | 7/1978 | Taylor et al. | 526/3 |
| 4,190,602 | 2/1980 | Brunisholz et al. | 260/590 D |
| 4,206,301 | 6/1980 | Yolles | 536/3 |
| 4,360,606 | 11/1982 | Tobias et al. | 523/124 |
| 4,492,645 | 1/1985 | Sprecker et al. | 252/522 R |
| 4,571,344 | 2/1986 | Pettet et al. | 426/535 |
| 4,623,538 | 11/1986 | Pettet et al. | 424/52 |
| 4,626,599 | 12/1986 | Pettet et al. | 568/57 |
| 4,722,845 | 2/1988 | Cherukuri et al. | 426/5 |
| 4,804,002 | 2/1989 | Herron | 131/365 |
| 4,806,364 | 2/1989 | Kubota | 426/5 |
| 4,808,418 | 2/1989 | Zamudio-Tena | 426/5 |
| 4,839,184 | 6/1989 | Cherukuri et al. | 426/307 |
| 4,845,156 | 7/1989 | Cohen | 525/259 |
| 4,863,745 | 9/1989 | Zibell | 426/5 |
| 4,931,294 | 6/1990 | Courtright et al. | 426/5 |
| 4,988,518 | 1/1991 | Patel | 426/5 |
| 5,167,972 | 12/1992 | Greenberg | 426/3 |

OTHER PUBLICATIONS

Steffen Arctander, Perfume and Flavor Chemicals (Aroma Chemicals. Published by the Author 1969, Montclair, N.J. (USA) Sections 268–274.

Heath, Henry B., M.B.E., B. Pharm. (London) Flavor Technology: Profiles, Products, Applications, 1978 The Avi Publishing Company, In., Westport, Conn., pp. 315–329.

Thomas E. Furia and Nicolo Bellanca, Fenaroli's Handbook of Flavor Ingredients, Second Edition, vol. 2, Published by CRC Press, Inc., Cleveland OH, p. 595.

*Primary Examiner*—Michael G. Wityshyn
*Assistant Examiner*—Ralph Gitomer
*Attorney, Agent, or Firm*—Willian Brinks Hofer Gilson & Lione

[57] ABSTRACT

Chewing gum compositions having improved dipeptide-sweetener stability are provided. The chewing gums of the invention contain dipeptide sweetener(s) and at least one benzaldehyde acetal. Cherry-flavored and chocolate-cherry flavored chewing gums having improved dipeptide-sweetener stability are also provided.

9 Claims, No Drawings

METHOD OF STABILIZING PEPTIDE SWEETENERS IN CHEWING GUMS AND CONFECTIONS WITH BENZALDEHYDE ACETALS

This is a continuation-in-part of application Ser. No. 07/595,093, filed Oct. 10, 1990 now abandoned, and is also a continuation-in-part of application Ser. No. 07/577,770, filed Sep. 4, 1990, now U.S. Pat. No. 5,167,972.

BACKGROUND OF THE INVENTION

The present invention relates to methods for producing chewing gum. More particularly, the invention relates to methods for producing chewing gum containing acetals of benzaldehyde and peptide sweeteners with improved shelf-life stability.

In recent years, efforts have been devoted to protecting peptide sweeteners within the chewing gum formulation from interaction in the presence of aldehyde ingredients, i.e., the protection of the high-potency sweetener against degradation over time. The instability is significant because aldehyde-containing flavor components have been known to react with peptide sweeteners such as aspartame and thereby greatly reduce the shelf-stability of aspartame in such a gum.

For example, U.S. Pat. Nos. 4,722,845, issued Feb. 2, 1988, and 4,839,184, issued Jun. 13, 1989, both to Cherukuri et al., teach a process for stabilizing an aldehyde-containing chewing gum in which a dipeptide or amino acid sweetener is encapsulated in a mixture of fat, wax and glyceride. The inventions teach an advantage in using an edible wax with a melting point of 106° C. or greater. First, the fat, wax and glyceride are mixed to form a "hydrophobic matrix." Then, the sweetener is formed into an agglomerate with this hydrophobic matrix. The agglomerates are next screened for appropriate size. Finally, the second or further coating with the hydrophobic matrix is applied using standard fluidized bed granulation techniques. Alternately, the initial coating can be applied by spray congealing techniques. Both of the above Cherukuri et al. patents teach that aspartame is difficult to coat, because of its needle-like shape. To adequately coat aspartame, approximately six times as much coating material as aspartame was used.

U.S. Pat. No. 4,863,745, issued Sep. 5, 1989, to Zibell, teaches a method of encapsulating aspartame or other high-potency sweeteners by applying to already-coated aspartame a second coat consisting predominately of zein, a corn protein. This method results in more gradual release of high-potency sweetness and in protection from degradation by aldehyde constituents.

U.S. Pat. No. 4,931,295, issued Jun. 5, 1990, to Courtright et al., discloses the preparation of a softer zein coating for aspartame which is water soluble and includes water-soluble cellulose. Courtright et al. disclose that encapsulation and protection from degradation occurs when the final product comprises as little as 10% zein.

Examples of aldehyde containing flavoring agents include, but are not limited to, cinnamon flavor, which includes cinnamaldehyde; cherry flavor, which includes benzaldehyde; lemon flavors, which contain citral and citronellal; vanilla flavor, which includes vanillin and ethyl vanillin; fruit flavors, which include acetaldehyde; and orange flavor, which includes undecanal. Other flavors which include aldehyde-containing components can be found on pages 325–328 of the book *Flavor Technology: Profiles, Products, Applications*, by Henry B. Heath, M.B.E., B. Pharm., published in 1978 by The AVI Publishing Co., Inc., Westport, Conn. Cherry flavor is a popular aldehyde-containing flavor used in chewing gum and includes benzaldehyde.

Benzaldehyde is the primary ingredient in cherry flavoring. In Section 268 of Volume 1 of Steffen Arctander's *Perfume and Flavor Chemicals*, published by the author in Montclair, N.J. in 1969, benzaldehyde is described as having a "powerful sweet odor, reminiscent of freshly crushed bitter almonds." Besides cherry and almond, benzaldehyde is used in "berry, butter, apricot, brandy, coconut, liquor, peach, plum, pecan, pistachio, rum spice and vanilla." Id. Benzaldehyde has been added to a variety of foods, including gum. In chewing gum, however, the benzaldehyde flavor reacts with peptide sweeteners where present to form non-sweet products. In addition, the cherry flavor may change after a few minutes of chewing. Methods of preventing the dissipation of aldehyde flavors, including the chemical combination of aldehyde flavors with other moieties, have been investigated.

Co-pending, commonly assigned, U.S. patent application Ser. No. 07/577,770, filed on Sep. 4, 1990, by Michael Greenberg and Sonya Johnson, entitled "Method of Stabilizing Peptide Sweeteners in Cinnamon-Flavored Chewing Gums and Confections," discloses the combination of dipeptide sweeteners and cinnamaldehyde acetal, and particularly cinnamaldehyde propylene glycol acetal (CAPGA), in gum and other foods. The acetals of benzaldehyde also have been reported.

In Section 274 of Arctander's *Perfume and Flavor Chemicals*, benzaldehyde propylene glycol acetal is described as useful "in flavor compositions for imitation cherry, almond, nut, etc. particularly where greater stability and lower volatility... is desirable." Arctander also notes that "the acetal itself is practically odorless but will liberate benzaldehyde under influence[s] of moisture (particularly in the presence of acid) and heat." Id.

In Section 272 of Arctander's *Perfume and Flavor Chemicals*, benzaldehyde ethylene glycol acetal is described as "almost odorless when free from benzaldehyde but traces of moisture will free some aldehyde and influence the odor," suitable for "compositions where storage conditions favor a more stable form of benzaldehyde." Arctander points out that "the aldehyde is liberated under [the] influence of water, heat or acid." Id.

In Section 269 of Arctander's *Perfume and Flavor Chemicals*, benzaldehyde diethyl acetal is described as having a sweet, mild flavor, "faintly reminiscent of... bitter almond, but more herbaceous." Arctander notes that this acetal "offers some advantage in being milder, easier to handle, but... this material is sensitive to mild acid." Id.

In Section 273 of Arctander's *Perfume and Flavor Chemicals*, benzaldehyde glyceryl acetal is described as having a faint bitter almond odor and being a mixture of two acetals, a 1,2-form and a 1,3-form. This acetal is "used in flavor compositions where lower volatility and improved stability towards air (oxygen) is desirable, and the benzaldehyde as such seems too volatile and unstable." Id. "Under the influence of heat, water or mild acid," "the acetal will liberate benzaldehyde." Id. This acetal is "used in fruit flavors, imitation almond, cherry [and] nut," and "the most common outlet for the acetal" is chewing gum. Id.

In Section 271 of Arctander's *Perfume and Flavor Chemicals*, benzaldehyde dimethyl acetal is described as having a "sweet-green and warm odor, remotely reminiscent of nuts and bitter almonds" and is "used in . . . cherry, fruit, nut, [and] almond" flavors. This acetal also is "sensitive to mild acid and will not be stable in finished products of low pH." Id.

In Section 270 of Arctander's *Perfume and Flavor Chemicals*, benzaldehyde di-(ethylene glycol monobutyl ether) acetal is described as having a "mild-herbaceous, sweet and floral odor" and being used in jasmine fragrance.

Acetals have been combined with other flavor chemicals to produce longer-lived chemicals. U.S. Pat. No. 3,898,283, issued Aug. 5, 1975, to Schreiber et al., teaches methods to produce phenyl pentenals, as well as their acetals.

U.S. Pat. No. 3,908,023, issued Sep. 23, 1975, to Schreiber et al., further teaches the production of cinnamon like flavors with phenyl pentenals and their acetals. However, Schreiber points out that these chemicals are very stable, only hydrolyzing under "intense hydrolytic conditions" (col. 2, line 66). These conditions include a pH which is less than 2.5 or greater than 11.5, far different from the relatively neutral pH of saliva. This reference also teaches that 1,2- and 1,3-propylene glycol may be used in acetals to stabilize phenyl pentenals (col. 6, line 13).

U.S. Pat. No. 3,879,425, issued Apr. 22, 1975, to Hall et al., teaches that 3-phenyl-4-pentenal ethylene acetal is a stable precursor for the aldehyde, which has a green floral fragrance. It teaches that a variety of phenyl pentenals, can be combined with a variety of acetals. A list of such acetals includes propylene glycol acetal (col. 9, lines 50-51).

U.S. Pat. No. 4,571,344, issued Feb. 18, 1986, to Pittet et al., teaches preparation of a sustained release flavor by combining dithioethers of phenyl alkenals with silica and propylene glycol (cols. 23 and 24). Pittet also teaches using the silica mixture in chewing gum (col. 24, lines 43-54). Pittet also reports long-lasting flavor with the dithioether flavor alone (col. 24, lines 58-64).

Unfortunately, a disadvantage of all techniques for preventing peptide sweeteners from interacting with aldehyde compounds is that they call for encapsulating the sweetener. The more effective techniques for encapsulating the sweetener require long drying periods and coating the sweetener at least twice, an expensive process. Even then, the peptide sweetener is not always fully protected. What is needed is less expensive and more convenient protection of peptide sweeteners from chemical degradation by aldehyde compounds.

SUMMARY OF THE INVENTION

In accordance with one aspect of the present invention, there is provided a method of manufacturing a chewing gum which includes adding at least one benzaldehyde acetal to the flavor ingredients which constitute about 0.1% to about 10% by weight of the chewing gum.

In accordance with another aspect of the present invention, there is provided a dipeptide. sweetened chewing gum with improved stability. This chewing gum includes flavor ingredients at a level of about 0.1 % to about 10% by weight of the chewing gum. The flavor ingredients include at least one benzaldehyde acetal.

In accordance with another aspect, the present invention provides a chewing gum composition including as dipeptide sweeteners aspartame, alitame and others or combinations.

In accordance with another aspect, the present invention provides a chewing gum composition which includes benzaldehyde acetals formed by the reaction of benzaldehyde with propylene glycol, ethylene glycol, ethanol, butyl alcohol, glycerol, amyl alcohol, isoamyl alcohol, isopropyl alcohol, n-propyl alcohol and methanol.

In accordance with another aspect, the present invention provides a food, drug or other oral composition which has a relatively low moisture content and includes one or more benzaldehyde acetals as a flavor ingredient.

In accordance with another aspect, the present invention provides a method for altering the flavor of a food, drug or other oral composition by adding one or more acetals of benzaldehyde to the food.

DETAILED DESCRIPTION

The present invention contemplates the use of benzaldehyde acetals, i.e., compounds having the generic structure shown below:

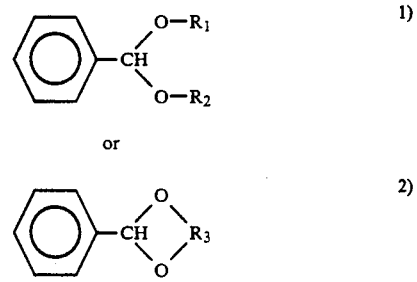

where $R_N$ are alkyl or substituted alkyl groups, which groups are determined by the alcohol or alcohols reacted with benzaldehyde to produce the acetal. If one monofunctional alcohol reacts with benzaldehyde, the first structure is obtained, in which $R_1$ and $R_2$ are the same. If more than one monofunctional alcohol reacts with benzaldehyde, $R_1$ and $R_2$ may be the same or different. If a difunctional alcohol or glycerol reacts with benzaldehyde, the second structure above results.

Most preferred of the acetals is benzaldehyde propylene glycol acetal (BAPGA), which is available from Penta Manufacturing, Fairfield, N.J. Less preferred are acetals formed by condensation of benzaldehyde with ethylene glycol, ethanol, butyl alcohol, glycerol, amyl alcohol, isoamyl alcohol, isopropyl alcohol, n-propyl alcohol and methanol. Any other food acceptable acetal of benzaldehyde also may be used.

While not wishing to be bound by any particular theory, it appears that aldehydes react rapidly with peptide sweeteners through a Schiff base reaction as shown below:

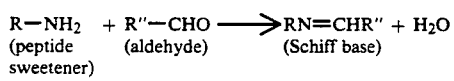

However, when the aldehyde is converted to the acetal by reaction with an alcohol under acidic conditions as shown below, the Schiff base reaction cannot occur.

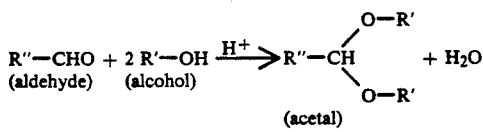

The acetals are relatively stable under dry conditions. When the acetals are exposed to water, they re-convert to the aldehyde, according to the following reaction:

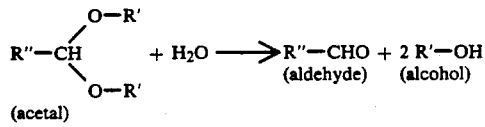

The present invention contemplates the blending of benzaldehyde acetals with other flavor ingredients of food acceptable quality. Examples of flavor ingredients which may be blended with benzaldehyde acetals include essential oils, synthetic flavors, or mixtures thereof, including but not limited to, oils derived from plants and fruits such as citrus oils, fruit essences, peppermint oil, spearmint oil, clove oil, anise and the like. Also exemplary of flavor blends which contain benzaldehyde acetals are cherry and other fruit flavors.

Benzaldehyde acetal ingredients can also be combined with other flavors to produce flavor combinations. One such example is the combination of benzaldehyde acetal and other cherry flavoring ingredients with sufficient cocoa powder to produce chocolate cherry flavor.

Artificial flavor ingredients are also contemplated for blending with benzaldehyde acetals. Those skilled in the art will recognize that natural and artificial flavor ingredients may be combined with benzaldehyde acetals in any manner. All such flavor ingredients and blends are contemplated for use in the method of the present invention.

A preferred use of this invention is in chewing gum. This invention can also be used in a variety of other products, examples of which are foods such as candies, dry beverages, gelatin and pudding mixes, drugs and toothpaste. The preferred embodiments are in foodstuffs with a relatively low moisture content, at least during storage. Preferably, the formulation of the food is less than 10% by weight water. More preferred is less than 5% water. Even more preferred is a water content less than 2%. Most preferred is a water content less than 1%. All percentages given herein are by weight unless otherwise specified.

As mentioned above, a presently preferred use for benzaldehyde acetal is the incorporation of benzaldehyde acetals into chewing gum. Benzaldehyde acetal may be mixed with the chewing gum ingredients at any time during the manufacturing process. More preferred is the addition of benzaldehyde acetals to other flavor ingredients before incorporation into chewing gum ingredients; this contributes to better blending. Preferably, this flavor mixture is added to the chewing gum mixture near the end of the mixing process. If water-bearing ingredients are used in the chewing gum composition, it is preferable that benzaldehyde acetals be kept separate from such ingredients as long as possible to minimize hydrolysis of the acetal.

In general, a chewing gum composition comprises a water soluble bulk portion, a water insoluble chewable gum base portion and, typically, water insoluble flavor ingredients. The water soluble portion dissipates with a portion of the flavor over a period of time during chewing. The gum base portion is retained in the mouth throughout the chew.

The insoluble gum base generally comprises elastomers, resins, fats and oils, waxes, softeners and inorganic fillers. Elastomers may include poly. isobutylene, isobutylene-isoprene copolymer, styrene butadiene rubber, as well as natural latexes such as chicle. Resins include polyvinylacetate and terpene resins. Fats and oils may also be included in the gum base including tallow, hydrogenated and partially hydrogenated vegetable oils and cocoa butter. Commonly employed waxes include beeswax and carnauba. The insoluble gum base constitutes about 5 to about 95% of the gum. Preferably, the gum comprises about 10 to about 50% of insoluble gum base, and more preferably about 20 to 30%.

The gum base typically also includes a filler component. The filler component may be magnesium carbonate, talc, dicalcium phosphate, and the like. The filler may constitute between about 5 to about 60% of the gum base. Preferably, the chewing gum base comprises about 5 to 50% filler.

The gum base typically also contains softeners, including glycerol monostearate and glycerol triacetate. Further, gum bases may also contain optional ingredients such as antioxidants, colors and emulsifiers. The present invention contemplates employing any commercially acceptable gum base.

The water soluble portion of chewing gum may further comprise softeners, sweeteners, flavors and combinations thereof. The softeners are added to the chewing gum in order to optimize the chewability and mouth feel of the gum. Softeners, also known in the art as plasticizers or plasticizing agents, generally con. stitute about 0.1 to about 15% of the chewing gum. Softeners contemplated by the present invention include glycerin, lecithin and combinations thereof. Aqueous sweetener solutions such as those containing sorbitol, hydrogenated starch hydrolysates, corn syrup and combinations thereof may be used as softeners and binding agents in gum. Because of the potential hydrolysis of benzaldehyde acetals, a preferred embodiment minimizes or eliminates these ingredients.

The chewing gums and oral compositions of the present invention will include one or more peptide sweeteners. These sweeteners are di- or higher peptides typically modified with an alkyl ester group and including at least one free amine group. These sweeteners typically possess intense sweetness several hundred times that of sucrose. The most commonly used peptide sweeteners are the dipeptide sweeteners known as aspartame and alitame. These sweeteners may be used uncoated or coated, for example, as described in U.S. Pat. No. 4,673,577, issued Jun. 16, 1987, to Patel and U.S. Pat. No. 4,931,295, issued Jun. 5, 1990, to Courtright et al.

Other sweeteners contemplated by the present invention for use in chewing gum include both sugar and sugarless components. Sugar sweeteners generally include saccharide-containing components commonly known in the chewing gum art which comprise but are not limited to sucrose, dextrose, maltose, dextrin, dried invert sugar, fructose, levulose, galactose, corn syrup solids and the like, alone or in any combination. Sugarless sweeteners include components with sweetening characteristics but are devoid of the commonly known sugars and comprise, but are not limited to, sugar alcohols such as sorbitol, mannitol, xylitol, hydrogenated starch hydrolysates, maltitol and the like, alone or in any combination.

Although the present invention is intended for use with peptide sweeteners, other high intensity sweeteners may be used in addition to the peptide sweetener. Other high intensity sweeteners include sucralose, cyclamate, acesulfame-K, dihydrochalcones and saccharin.

Any combination of sugar and/or sugarless sweeteners may be employed in the chewing gum. Further, a sweetener may be present in a chewing gum in whole or in part as a water soluble bulking agent. In addition, the softener may be combined with a sweetener such as an aqueous sweetener solution.

The flavor ingredients contemplated by the present invention include flavor ingredients which are of food acceptable quality and are compatible with benzaldehyde acetals. Benzaldehyde acetal flavor may be blended with other essential oils, synthetic flavor ingredients, or mixtures thereof, including but not limited to oils derived from plants and fruits such as citrus oils, fruit essences, peppermint oil, spearmint oil, clove oil, anise, cola, chocolate and the like. Artificial flavor ingredients are also contemplated by the present invention. Those skilled in the art will recognize that the natural and artificial flavor ingredients may be combined in any variety of ways.

Benzaldehyde acetals may be added to chewing gum in which the chewing gum comprises from about 0.1% to about 10% flavor ingredients. Preferably, the chewing gum is about 0.5% to about 5% flavor ingredients. When used in chewing gum, the optimum level of benzaldehyde acetals is preferably determined through sensory testing. The level is expected to vary widely depending on the type and level of gum base used, the type and level of flavor used, and other factors. The level used will also vary with the different acetals. Benzaldehyde acetals may be used at a level of about 0.01% to about 100% of the flavor ingredients. Preferably, the level of benzaldehyde acetal is between about 0.1% and about 60% of the total flavor composition.

In another embodiment, in cherry-flavored gum, the flavor ingredients comprise at least 10% benzaldehyde acetal. Preferably, the level of benzaldehyde acetal is between about 20% and about 60% of the flavor ingredients, depending on the results of sensory testing. In cherry-flavored gum, benzaldehyde acetal most preferably constitutes about 0.5 to 2% of the weight of the gum, while other flavors may be used at about 0-2% of the weight of the gum.

In another embodiment, a small quantity of benzaldehyde is added to adjust the character of flavors containing benzaldehyde acetal. In such a case, the level of benzaldehyde is kept to a minimum in order to reduce degradation of the peptide sweetener. Preferably, benzaldehyde constitutes less than about 50% of th benzaldehyde/benzaldehyde acetal portion. Even more preferably, benzaldehyde is less than about 25% of the benzaldehyde/benzaldehyde acetal portion.

Other ingredients such as colors, emulsifiers, and pharmaceutical agents may be added to the chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting the gum base and adding it to the running mixer. The base may also be melted in the mixer itself. Color may also be added at this time. A softener such as glycerin may then be added next along with syrup and a portion of bulking agent. Further portions of the bulking agents may be added to the mixer. Under proper conditions, benzaldehyde acetals may be added at any time during the gum manufacturing process. Preferably, the flavor of the present invention is first mixed into other flavor ingredients before addition to the gum mixture. Preferably, the flavor ingredients are added to the gum mixture near the end of the mixing process.

The entire mixing procedure typically takes from about 5 minutes to about 15 minutes, but longer mixing times may sometimes be required.

According to another aspect of the invention, benzaldehyde acetals may be used to flavor other foods, drugs or other oral compositions. Preferably, the flavor ingredients constitute from about 0.01% to about 10% of the oral composition. When used in oral compositions, the optimum level of benzaldehyde acetal is from about 0.01% to about 60% of the flavor ingredients. In a particular embodiment, benzaldehyde acetal is added to toothpaste.

Those skilled in the art will recognize that variations of the above described procedure may be followed. It is to be understood that an equivalent of changes and modifications of the embodiments described above are also contemplated by the present invention. The following examples are not to be construed as limitations upon the present invention, but are included merely as an illustration of various embodiments.

EXAMPLES

Example 1

To demonstrate the effectiveness of acetals in preventing aspartame breakdown, the stability of aspartame in solution with benzaldehyde or with an acetal of benzaldehyde was tested in the following manner:

1. A stock solution was prepared by dissolving 4.9854 g of aspartame in 1,000 ml of methanol. To ensure complete dissolution, the mixture was stirred at room temperature for 24 hours.

2. 1 ml of the stock solution was removed, added to 100 ml of aqueous buffer (to arrest degradation of aspartame), and analyzed by high pressure liquid chromatography (HPLC) for aspartame content. This value was the $T_0$ value for aspartame concentration.

3. 100 ml of the stock solution was removed to another container, to which 1.7451 g of benzaldehyde was added. This solution was stirred constantly with a magnetic stirrer.

4. 1 ml samples were removed from the benzaldehyde solution 90 and 120 minutes after benzaldehyde was added. Each sample was diluted with 100 ml of aqueous buffer and analyzed by HPLC for aspartame. Results are shown in Table 1.

5. Another 100 ml portion of the stock aspartame-in-methanol solution was treated identically except that the 1.7451 g benzaldehyde was replaced with an equimolar amount of benzaldehyde propylene glycol acetal (BAPGA), or 2.700 g. Samples were obtained at the same intervals as above and results are shown in Table 1 By substituting BAPGA for benzaldehyde, aspartame degradation was reduced by 95%.

TABLE 1

HPLC DETERMINATION OF ASPARTAME

| Time (min) | Remaining Aspartame in Methanol (mg/100 ml) | |
|---|---|---|
| | Benzaldehyde | BAPGA |
| 0 | 4.99 | 4.99 |
| 90 | 3.54 | 4.84 |
| 180 | 2.59 | 4.86 |

EXAMPLE 2

To determine the results of benzaldehyde acetal substitution on an actual product, three laboratory-scale batches of gum are prepared using the following formulas.

| INGREDIENT | TEST GUM FORMULAS (weight %) | | |
|---|---|---|---|
| | A | B | C |
| Sorbitol | 48.098 | 47.858 | 47.788 |
| Gum Base | 30.00 | 30.00 | 30.00 |
| Mannitol | 10.00 | 10.00 | 10.00 |
| Glycerin | 8.80 | 8.80 | 8.80 |
| Lecithin | 0.50 | 0.50 | 0.50 |
| Red Color | 0.002 | 0.002 | 0.002 |
| Citric Acid | 0.60 | 0.60 | 0.60 |
| Aspartame | 0.50 | 0.50 | 0.50 |
| Flavor Mix | 0.93 | 0.93 | 0.93 |
| Benzaldehyde | 0.57 | 0.14 | — |
| BAPGA* | — | 0.67 | 0.88 |
| TOTAL | 100.00 | 100.00 | 100.00 |

*Benzaldehyde propylene glycol acetal

The flavor mix is a typical blend of complementary essential oils and other flavor components (with no significant aldehyde content), as given in *Fenaroli's Handbook of Flavor Ingredients*, 2d ed., edited by T. E. Furia and N. Ballanca, published by CRC Press, Cleveland, Ohio, 1975, Vol. 2, p. 595. The flavor mix can consist primarily of 0.164 g amyl acetate, 0.061 g ethyl acetate, 0.016 lemon essential oil, 0.026 g Orris resinoid, 0.144 g rum ether, 0.016 g o,m,p-toluic aldehyde, 0.088 g vanillin, and 0.415 g solvent.

As in Example 1, a greater weight of BAPGA replaces the benzaldehyde to maintain molarity.

The three chewing gums are mixed, rolled flat and cut into pieces of gum which are wrapped in moisture resistant packaging and aged at 85° F.

Replacement of three fourths of the benzaldehyde with BAPGA can be expected to reduce aspartame loss adequately. Replacement of all of the benzaldehyde with BAPGA can be expected to reduce aspartame loss markedly.

Encapsulation of the aspartame will further improve stability when used in combination with the present invention.

EXAMPLE 3

Chocolate-cherry-flavored gum is prepared similarly to the cherry-flavored gum in Example 2. Three laboratory-scale batches of gum are prepared using the following formulas.

| INGREDIENT | TEST GUM FORMULAS (weight %) | | |
|---|---|---|---|
| | A | B | C |
| Sorbitol | 46.098 | 45.858 | 45.788 |
| Gum Base | 30.00 | 30.00 | 30.00 |
| Mannitol | 10.00 | 10.00 | 10.00 |
| Glycerin | 8.80 | 8.80 | 8.80 |
| Lecithin | 0.50 | 0.50 | 0.50 |
| Red Color | 0.002 | 0.002 | 0.002 |
| Citric Acid | 0.60 | 0.60 | 0.60 |
| Aspartame | 0.50 | 0.50 | 0.50 |
| Cocoa Powder | 2.00 | 2.00 | 2.00 |
| Flavor Mix | 0.93 | 0.93 | 0.93 |
| Benzaldehyde | 0.57 | 0.14 | — |
| BAPGA* | — | 0.67 | 0.88 |
| TOTAL | 100.00 | 100.00 | 100.00 |

*Benzaldehyde propylene glycol acetal

As in Example 2, the same "Flavor mix" is used to provide cherry flavoring, and a greater weight of BAPGA replaces the benzaldehyde to maintain molarity.

The three chewing gums are mixed, rolled flat and cut into pieces of gum which are wrapped in moisture resistant packaging and aged at 85° F.

Replacement of three fourths of the benzaldehyde with BAPGA can be expected to reduce aspartame loss adequately. Replacement of all of the benzaldehyde with BAPGA can be expected to reduce aspartame loss markedly.

Encapsulation of the aspartame will further improve stability when used in combination with the present invention.

We claim:

1. A method of improving the stability of a dipeptide sweetener in chewing gum comprising the step of mixing (1) chewing gum ingredients comprising dipeptide sweetener and (2) flavor ingredients comprising at least one benzaldehyde acetal, wherein said flavor ingredients comprise from about 0.1% to about 10% by weight of the chewing gum and said benzaldehyde acetal comprises from about 0.1% to about 60% by weight of the flavor ingredients.

2. The method of claim 1 in which the dipeptide sweetener is selected from the group consisting of aspartame, alitame, and combinations thereof.

3. The method of claim 1 wherein the flavor ingredients comprise cherry flavor ingredients at a level of about 0.1% to about 4% by weight of the chewing gum.

4. The method of claim 3 wherein the cherry flavor ingredients comprise benzaldehyde acetal at a level of about 20% to about 60% by weight of the flavor ingredients.

5. A chewing gum with improved dipeptide sweetener stability comprising gum ingredients; dipeptide sweetener; and flavor ingredients, said flavor ingredients being present in an amount of about 0.1% to about 10% by weight of the chewing gum and comprising at least one benzaldehyde acetal in an amount of about 0.1% to about 60% by weight of the flavor ingredients.

6. The chewing gum of claim 5 wherein the dipeptide sweetener is selected from the group consisting of aspartame, alitame and combinations thereof.

7. The chewing gum of claim 5 comprising cherry flavor ingredients at a level of about 0.1% to about 4% by weight of the chewing gum.

8. The chewing gum of claim 7 wherein the cherry flavor ingredients comprise benzaldehyde acetal at a level of about 10% to about 60% by weight of the flavor ingredients.

9. The chewing gum of claim 5 wherein the chewing gum is chocolate-cherry flavored, and wherein the cherry flavor ingredients constitute about 0.1% to about 4% by weight of the chewing gum.

* * * * *

UNITED STATES PATENT AND TRADEMARK OFFICE
CERTIFICATE OF CORRECTION

PATENT NO. : 5,277,919
DATED : January 11, 1994
INVENTOR(S) : Michael J. Greenberg et al.

It is certified that error appears in the above-indentified patent and that said Letters Patent is hereby corrected as shown below:

ON THE COVER PAGE: (Item [56] References Cited)

Under "OTHER PUBLICATIONS" insert --American Chemical Society, Chemical Abstracts, 87(23): 182,728v, "To Find Imitation Flavor Components Contained in Two Yogurts (Pineapple and Strawberry) in the Market" (1977), abstract of J.S. Chou, Koryo, 118, 73-77 (1977).--

In column 1, line 61, delete "aldehyde containing" and substitute therefor --aldehyde-containing--.

In column 3, lines 19 and 20, delete "cinnamon like" and substitute therefor --cinnamon-like--.

In column 3, line 63, delete "dipeptide. sweetened" and substitute therefor --dipeptide-sweetened--.

In column 6, line 8, delete "poly.isobutylene" and substitute therefor --polyisobutylene--.

In column 6, line 36, delete "con.stitute" and substitute therefor --constitute--.

In column 7, line 59, delete "th" and substitute therefor --the--.

UNITED STATES PATENT AND TRADEMARK OFFICE
CERTIFICATE OF CORRECTION

PATENT NO. : 5,277,919
DATED : January 11, 1994
INVENTOR(S) : Michael J. Greenberg, et al.

It is certified that error appears in the above-indentified patent and that said Letters Patent is hereby corrected as shown below:

Column 9, line 2, after "1" insert --.--.

Signed and Sealed this

Eleventh Day of October, 1994

Attest:

BRUCE LEHMAN

Attesting Officer

Commissioner of Patents and Trademarks